(12) United States Patent
Ka et al.

(10) Patent No.: US 12,431,523 B2
(45) Date of Patent: Sep. 30, 2025

(54) FUEL CELL

(71) Applicants: Hyundai Motor Company, Seoul (KR); Kia Corporation, Seoul (KR)

(72) Inventors: Dae Han Ka, Yongin-si (KR); Yong Suk Heo, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 609 days.

(21) Appl. No.: 17/964,616

(22) Filed: Oct. 12, 2022

(65) Prior Publication Data

US 2023/0411665 A1    Dec. 21, 2023

(30) Foreign Application Priority Data

Jun. 16, 2022    (KR) .................... 10-2022-0073423

(51) Int. Cl.
*H01M 8/248*    (2016.01)
*H01M 8/0267*    (2016.01)
*H01M 8/2475*    (2016.01)

(52) U.S. Cl.
CPC ......... *H01M 8/248* (2013.01); *H01M 8/0267* (2013.01); *H01M 8/2475* (2013.01)

(58) Field of Classification Search
CPC .. H01M 8/248; H01M 8/0267; H01M 8/2475; H01M 2250/20; H01M 8/04037; H01M 8/2465; H01M 8/04029; Y02E 60/50
See application file for complete search history.

(56) References Cited

U.S. PATENT DOCUMENTS

| | | | |
|---|---|---|---|
| 11,552,311 B2* | 1/2023 | Ko ...................... | H01M 8/2418 |
| 2012/0100450 A1* | 4/2012 | Lee ..................... | H01M 8/0267 |
| | | | 429/436 |
| 2017/0352900 A1* | 12/2017 | Kim ................... | H01M 8/04225 |
| 2020/0185732 A1* | 6/2020 | Nam ...................... | H01M 8/24 |
| 2022/0140378 A1* | 5/2022 | Ahn .................. | H01M 8/04037 |
| | | | 429/435 |
| 2022/0149397 A1* | 5/2022 | Ko .................... | H01M 8/04067 |

* cited by examiner

*Primary Examiner* — Muhammad S Siddiquee
(74) *Attorney, Agent, or Firm* — Fish & Richardson P.C.

(57) ABSTRACT

A fuel cell of the disclosure includes a cell stack including a plurality of unit cells stacked in a first direction, an end plate disposed on at least one of the two ends of the cell stack, a heating element disposed between the end plate and the cell stack, and a heater connector embedded in the end plate and electrically connected to the heating element. The end plate includes a core having a first rigidity and having a first recess defined therein to receive at least a portion of the heater connector, a reinforcement plate covering the first recess and having a second rigidity, and a clad having a third rigidity less than each of the first rigidity and the second rigidity and disposed so as to envelop the heater connector and to cover the core and the reinforcement plate.

16 Claims, 12 Drawing Sheets

FUEL CELL

CROSS-REFERENCE TO RELATED APPLICATION

This application claims the benefit of Korean Patent Application No. 10-2022-0073423, filed on Jun. 16, 2022, the disclosure of which is incorporated herein by reference in its entirety.

TECHNICAL FIELD

Implementations relate to a fuel cell.

BACKGROUND

In general, in a fuel cell, each of a plurality of unit cells generates electricity using air supplied to one surface of a polymer electrolyte membrane and hydrogen supplied to the opposite surface of the polymer electrolyte membrane. An end plate may be disposed on each of both ends of a cell stack composed of a plurality of unit cells, and a heater wiring connector may be disposed on each end plate. The heater wiring connector may receive a drive signal (voltage or current) necessary to drive a heating element from the cell stack. In addition, the end plate may include a metal portion and a resin portion, and the heater wiring connector may be seated on the metal portion and may be attached thereto by the resin portion.

In this case, in the end plate that is in contact with a gasket, which is disposed between each of the first cell and the last cell of the cell stack and the end plate, a resin portion corresponding to the portion on which the heater wiring connector is disposed is not flat, which adversely affects seal reliability at the interface between the cell stack and the end plate, leading to degradation of the quality of the stack. Therefore, research with the goal of solving this problem is underway.

SUMMARY

Accordingly, implementations are directed to a fuel cell that substantially obviates one or more problems due to limitations and disadvantages of the related art.

Implementations provide a fuel cell having excellent seal reliability.

However, objects to be accomplished by the implementations are not limited to the above-mentioned objects, and other objects not mentioned herein will be clearly understood by those skilled in the art from the following description.

A fuel cell according to an implementation may include a cell stack including a plurality of unit cells stacked in a first direction, an end plate disposed on at least one of the two ends of the cell stack, a heating element disposed between the end plate and the cell stack, and a heater connector embedded in the end plate and electrically connected to the heating element. The end plate may include a core having a first rigidity and having a first recess defined therein to receive at least a portion of the heater connector, a reinforcement plate covering the first recess and having a second rigidity, and a clad having a third rigidity less than each of the first rigidity and the second rigidity and disposed so as to envelop the heater connector and to cover the core and the reinforcement plate.

In an example, the reinforcement plate and the core may be made of the same material.

In an example, the end plate may further include a second recess defined around the first recess to receive the reinforcement plate.

In an example, the reinforcement plate may be located between a distal end of the end plate and a reaction surface in a second direction intersecting the first direction.

In an example, the reinforcement plate may include a first surface facing the end plate and a second surface located opposite the first surface and facing the cell stack. The inner surface of the end plate that faces the cell stack and the second surface of the reinforcement plate may form the same horizontal surface.

In an example, the clad may include a first portion, which is embedded in the first recess and is disposed between the heater connector and the core and between the heater connector and the reinforcement plate, and a second portion, which covers the second surface of the reinforcement plate and at least a portion of the inner surface of the end plate.

In an example, the end plate may further include a first coupling portion defined in the second recess, and the reinforcement plate may include a second coupling portion coupled to the first coupling portion.

In an example, the fuel cell may further include a screw to couple the first coupling portion and the second coupling portion to each other in a screw-coupling manner.

In an example, the heater connector may include a first terminal connected to the heating element, an extension portion connected to a drive signal driving the heating element, and a connection portion interconnecting the first terminal and the extension portion and embedded in the second recess.

In an example, the connection portion of the heater connector may include a third surface facing the end plate in the first direction and a fourth surface located opposite the third surface and facing the cell stack in the first direction.

In an example, the connection portion may include a body in which a wire is embedded, the wire interconnecting the first terminal and the extension portion and a support leg protruding from the body toward the bottom surface of the first recess in the first direction.

In an example, the end plate may include a first end plate disposed on one of the two ends of the cell stack and a second end plate disposed on the other of the two ends of the cell stack. The first end plate may include an oxygen inlet receiving air introduced thereinto from the outside, a hydrogen inlet receiving hydrogen introduced thereinto from the outside, a hydrogen outlet discharging hydrogen therethrough from the cell stack to the outside, and an oxygen outlet discharging oxygen therethrough from the cell stack to the outside. The second end plate may include a coolant inlet receiving a cooling medium introduced thereinto from the outside and a coolant outlet discharging the cooling medium therethrough to the outside.

In an example, the heater connector may be disposed between the hydrogen inlet and the oxygen outlet in the first end plate or between the oxygen inlet and the hydrogen outlet in the first end plate.

In an example, the heater connector may be disposed at a periphery of the coolant inlet or the coolant outlet in the second end plate.

BRIEF DESCRIPTION OF THE DRAWINGS

The accompanying drawings, which are included to provide a further understanding of the disclosure and are incorporated in and constitute a part of this application, illustrate implementation(s) of the disclosure and together with the description serve to explain the principle of the disclosure. In the drawings.

DETAILED DESCRIPTION

The present disclosure will now be described more fully hereinafter with reference to the accompanying drawings, in which various implementations are shown. The examples, however, may be embodied in many different forms and should not be construed as being limited to the implementations set forth herein. Rather, these implementations are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a fuel cell 100 according to an implementation will be described with reference to the accompanying drawings. The fuel cell 100 will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the implementations are not limited thereto. That is, the x-axis, the y-axis, and the z-axis may intersect each other obliquely. Hereinafter, for convenience of description, the +x-axis direction or the −x-axis direction will be referred to as a "first direction", the +y-axis direction or the −y-axis direction will be referred to as a "second direction", and the +z-axis direction or the −z-axis direction will be referred to as a "third direction".

Figure 1:
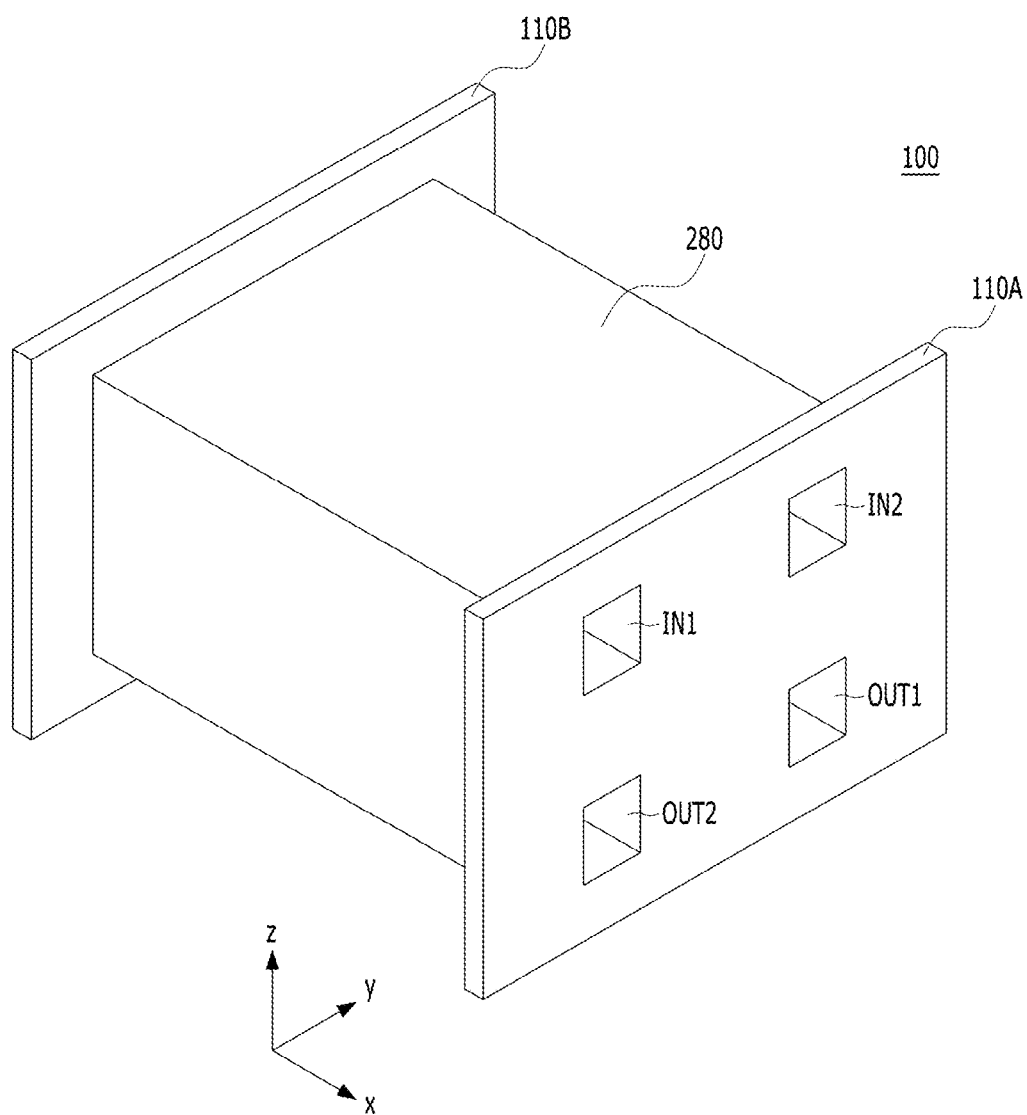
FIG. 1 is a perspective view showing the external appearance of a fuel cell.
Figure 2:
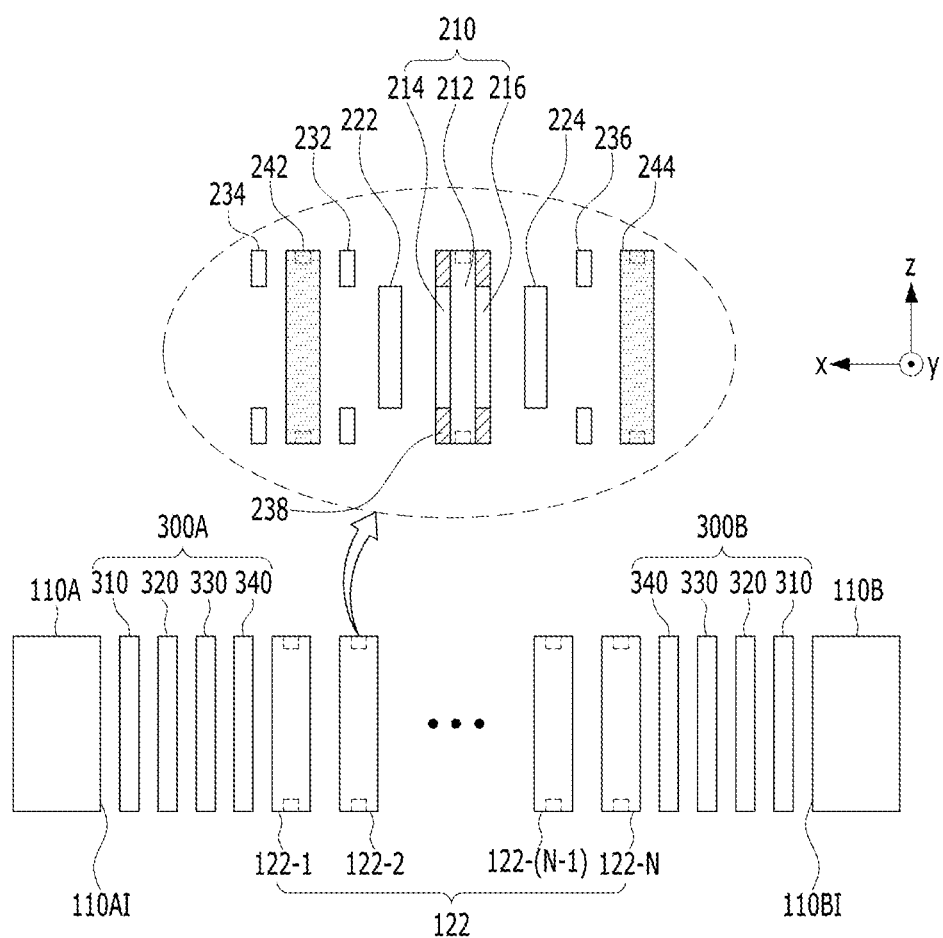
FIG. 2 is a cross-sectional view for explaining a cell stack included in the fuel cell.

FIG. 1 is a perspective view showing the external appearance of a fuel cell 100 according to an implementation, and FIG. 2 is a cross-sectional view for explaining a cell stack (or a power generation module) 122 included in the fuel cell 100 according to an implementation. Illustration of the enclosure 280 shown in FIG. 1 is omitted from FIG. 2.

The fuel cell 100 may be, for example, a polymer electrolyte membrane fuel cell (or a proton exchange membrane fuel cell) (PEMFC), which has been studied most extensively as a power source for driving vehicles. However, the implementations are not limited to any specific form of fuel cell.

The fuel cell 100 may include end plates (or pressing plates or compression plates) 110A and 110B, a cell stack 122, an enclosure 280, and first and second heater assemblies 300A and 300B.

The enclosure 280 shown in FIG. 1 may be coupled to the end plates 110A and 110B, and may be disposed so as to surround at least part of the side portions of the cell stack 122 disposed between the end plates 110A and 110B. The enclosure 280 may serve to clamp a plurality of unit cells together with the end plates 110A and 110B in the first direction. In other words, the clamping pressure of the cell stack 122 may be maintained by the end plates 110A and 110B, which have rigid body structures, and the enclosure 280. However, the clamping pressure of the cell stack 122 may be maintained without using the enclosure 280. The implementations are not limited to any specific configuration for maintaining the clamping pressure.

The end plates may be disposed on at least one of the two end portions of the cell stack 122, and may support and fix a plurality of unit cells. That is, the first end plate 110A may be disposed on one of the two end portions of the cell stack 122, and the second end plate 110B may be disposed on the other of the two end portions of the cell stack 122.

The fuel cell 100 may include a plurality of manifolds M. The manifolds may include a first inflow communication portion (or a first inlet manifold) IN1, a second inflow communication portion (or a second inlet manifold) IN2, a third inflow communication portion (or a third inlet manifold) IN3, a first outflow communication portion (or a first outlet manifold) OUT1, a second outflow communication portion (or a second outlet manifold) OUT2, and a third outflow communication portion (or a third outlet manifold) OUT3.

One of the first and second inflow communication portions IN1 and IN2 may correspond to a hydrogen inlet through which hydrogen, which is a reactant gas, is introduced into the cell stack 122 from the outside, and the other of the first and second inflow communication portions IN1 and IN2 may correspond to an oxygen inlet through which oxygen, which is a reactant gas, is introduced into the cell stack 122 from the outside. In addition, one of the first and second outflow communication portions OUT1 and OUT2 may correspond to a hydrogen outlet through which hydrogen, which is a reactant gas, and condensed water are discharged out of the cell stack 122, and the other of the first and second outflow communication portions OUT1 and OUT2 may correspond to an oxygen outlet through which oxygen, which is a reactant gas, and condensed water are discharged out of the cell stack 122.

In an example, the first inflow communication portion IN1 may correspond to a hydrogen inlet, the second inflow communication portion IN2 may correspond to an oxygen inlet, the first outflow communication portion OUT1 may correspond to a hydrogen outlet, and the second outflow communication portion OUT2 may correspond to an oxygen outlet.

In addition, the third inflow communication portion IN3 may correspond to a coolant inlet through which a cooling medium (e.g. coolant) is introduced from the outside, and the third outflow communication portion OUT3 may correspond to a coolant outlet through which a cooling medium is discharged to the outside.

The first and second outflow communication portions OUT1 and OUT2 may be disposed below the first and second inflow communication portions IN1 and IN2, the first inflow communication portion IN1 and the first outflow communication portion OUT1 may be disposed at positions separated from each other in an oblique direction, and the second inflow communication portion IN2 and the second outflow communication portion OUT2 may be disposed at positions separated from each other in an oblique direction. Due to this arrangement of the first and second inflow communication portions IN1 and IN2 and the first and second outflow communication portions OUT1 and OUT2, condensed water may be discharged from the lower portions of the unit cells included in the cell stack 122, or may remain in the lower portions of the unit cells due to gravity.

According to one implementation, the first and second inflow communication portions IN1 and IN2 and the first and second outflow communication portions OUT1 and OUT2 may be included in any one of the first and second end plates 110A and 110B (e.g. the first end plate 110A, as shown in FIG. 1), and the third inflow communication portion IN3 and the third outflow communication portion OUT3 may be included in the other of the first and second end plates 110A and 110B (e.g. the second end plate 110B shown in FIG. 1).

According to another implementation, all of the first to third inflow communication portions IN1 to IN3 and the first to third outflow communication portions OUT1 to OUT3 may be included in any one of the first and second end plates 110A and 110B.

Referring to FIG. 2, the cell stack 122 may include a plurality of unit cells 122-1 to 122-N, which are stacked in the first direction. Here, "N" is a positive integer of 1 or greater, and may range from several tens to several hundreds. "N" may be determined depending on the intensity of the power to be supplied from the fuel cell 100 to a load. Here, "load" may refer to a part requiring power in a vehicle that uses the fuel cell.

Each unit cell 122-$n$ may include a membrane electrode assembly (MEA) 210, gas diffusion layers (GDLs) 222 and 224, gaskets 232, 234, and 236, and separators (or bipolar plates) 242 and 244. Here, 1≤n≤N.

The membrane electrode assembly 210 has a structure in which catalyst electrode layers, in which electrochemical reactions occur, are attached to both sides of an electrolyte membrane through which hydrogen ions move. Specifically, the membrane electrode assembly 210 may include a polymer electrolyte membrane (or a proton exchange membrane) 212, a fuel electrode (a hydrogen electrode or an anode) 214, and an air electrode (an oxygen electrode or a cathode) 216. In addition, the membrane electrode assembly 210 may further include a sub-gasket 238.

The polymer electrolyte membrane 212 is disposed between the fuel electrode 214 and the air electrode 216.

Hydrogen, which is the fuel in the fuel cell 100, may be supplied to the fuel electrode 214 through the first separator 242, and air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. The hydrogen ions alone may be selectively transferred to the air electrode 216 through the polymer electrolyte membrane 212, and at the same time, the electrons may be transferred to the air electrode 216 through the gas diffusion layers 222 and 224 and the separators 242 and 244, which are conductors. In order to realize the above operation, a catalyst layer may be applied to each of the fuel electrode 214 and the air electrode 216. The movement of the electrons described above causes the electrons to flow through an external conductive wire, thus generating current. That is, the fuel cell 100 may generate electric power due to the electrochemical reaction between hydrogen, which is the fuel, and oxygen contained in the air.

In the air electrode 216, the hydrogen ions supplied through the polymer electrolyte membrane 212 and the electrons transferred through the separators 242 and 244 meet oxygen in the air supplied to the air electrode 216, thus causing a reaction that generates water (hereinafter referred to as "condensed water" or "product water"). The condensed water generated in the air electrode 216 may penetrate the polymer electrolyte membrane 212 and may be transferred to the fuel electrode 214.

In some cases, the fuel electrode 214 may be referred to as an anode, and the air electrode 216 may be referred to as a cathode. Alternatively, the fuel electrode 214 may be referred to as a cathode, and the air electrode 216 may be referred to as an anode.

The gas diffusion layers 222 and 224 serve to uniformly distribute hydrogen and oxygen, which are reactant gases, and to transfer the generated electrical energy. To this end, the gas diffusion layers 222 and 224 may be disposed on respective sides of the membrane electrode assembly 210. That is, the first gas diffusion layer 222 may be disposed on the left side of the fuel electrode 214, and the second gas diffusion layer 224 may be disposed on the right side of the air electrode 216.

The first gas diffusion layer 222 may serve to diffuse and uniformly distribute hydrogen supplied as a reactant gas through the first separator 242, and may be electrically conductive.

The second gas diffusion layer 224 may serve to diffuse and uniformly distribute air supplied as a reactant gas through the second separator 244, and may be electrically conductive.

Each of the first and second gas diffusion layers 222 and 224 may be a microporous layer in which fine carbon fibers are combined. However, the implementations are not limited to any specific forms of the first and second gas diffusion layers 222 and 224.

The gaskets 232, 234, and 236 serve to maintain the airtightness and clamping pressure of the cell stack at an appropriate level with respect to the reactant gases and the coolant, to disperse the stress when the separators 242 and 244 are stacked, and to independently seal the flow paths.

The separators 242 and 244 may serve to move the reactant gases and the cooling medium and to separate each of the unit cells from the other unit cells. In addition, the separators 242 and 244 may serve to structurally support the membrane electrode assembly 210 and the gas diffusion layers 222 and 224 and to collect the generated current and transfer the collected current to a current collector 340.

The separators 242 and 244 may be respectively disposed outside the gas diffusion layers 222 and 224. That is, the first separator 242 may be disposed on the left side of the first gas diffusion layer 222, and the second separator 244 may be disposed on the right side of the second gas diffusion layer 224.

The first separator 242 serves to supply hydrogen as a reactant gas to the fuel electrode 214 through the first gas diffusion layer 222. To this end, the first separator 242 may include an anode plate (AP), in which a channel (i.e. a passage or a flow path) is defined so that hydrogen is capable of flowing therethrough.

The second separator 244 serves to supply air as a reactant gas to the air electrode 216 through the second gas diffusion layer 224. To this end, the second separator 244 may include a cathode plate (CP), in which a channel is defined so that air containing oxygen is capable of flowing therethrough. In addition, each of the first and second separators 242 and 244 may form a channel through which a cooling medium is capable of flowing.

Further, the separators 242 and 244 may be made of a graphite-based material, a composite graphite-based material, or a metal-based material. However, the implementations are not limited to any specific material of the separators 242 and 244.

For example, each of the first and second separators 242 and 244 may include the first to third inflow communication portions IN1, IN2, and IN3 and the first to third outflow communication portions OUT1, OUT2, and OUT3, or may include some of the communication portions.

In other words, the reactant gases required for the membrane electrode assembly 210 may be introduced into the cell through the first and second inflow communication portions IN1 and IN2, and gas or liquid, in which the reactant gases humidified and supplied to the cell and the condensed water generated in the cell are combined, may be discharged to the outside of the fuel cell 100 through the first and second outflow communication portions OUT1 and OUT2.

In addition, the fuel cell 100 may further include a heater assembly. The heater assembly serves to raise the temperature of the cell stack 122 when the cell stack 122 in a cooled state is started up. To this end, the heater assembly may include at least one of a first heater assembly 300A or a second heater assembly 300B. In an example, as shown in FIG. 2, the heater assembly may include both the first heater assembly 300A and the second heater assembly 300B. Alternatively, the heater assembly may include only one of the first heater assembly 300A and the second heater assembly 300B. The first heater assembly 300A may be disposed between the cell 122-1, which is located on one of the two end portions of the cell stack 122, and an inner surface 110AI of the first end plate 110A, and the second heater assembly 300B may be disposed between the cell 122-N, which is located on the other of the two end portions of the cell stack 122, and an inner surface 110BI of the second end plate 110B.

According to one implementation, as shown in FIG. 2, each of the first and second heater assemblies 300A and 300B may include a current collector 340, a heating element (a heater or a planar heating element) 330, and a pad (an insulation pad or a silicon pad) 320. In addition, each of the first and second heater assemblies 300A and 300B may include a heater plate (or a bypass plate) 310. For better understanding of the positions at which the current collector 340, the heating element 330, the pad 320, and the heater plate 310 are disposed, the current collector 340, the heating element 330, the pad 320, and the heater plate 310 are illustrated schematically in FIG. 2, and the concrete configurations of these components 310, 320, 330, and 340 will be described later.

According to another implementation, unlike what is shown in FIG. 2, each of the first and second heater assemblies 300A and 300B may include the current collector 340, the heating element 330, the pad 320, and the end plates 110A and 110B. That is, unlike the above implementation, according to this implementation, the first end plate 110A serves as the first heater plate 310 of the first heater assembly 300A, and the second end plate 110B serves as the second heater plate 310 of the second heater assembly 300B, so the heater plate 310 may be omitted from each of the first and second heater assemblies 300A and 300B. With this exception, since the first and second heater assemblies 300A and 300B according to this implementation are the same as the first and second heater assemblies 300A and 300B according to the above implementation, a duplicate description thereof will be omitted.

Hereinafter, the first and second heater assemblies 300A and 300B will be described with reference to FIG. 2. The following description of the first and second heater assemblies 300A and 300B shown in FIG. 2 may also apply to the case described later in which each of the end plates 110A and 110B serves as the heater plate 310.

The current collector 340 may be disposed between each of the first and second end plates 110A and 110B, which face the cell stack 122, and the cell stack 122.

That is, the current collector 340 included in the first heater assembly 300A may be disposed between the heating element 330 and one (e.g. 122-1) of the two end portions of the cell stack 122. The current collector 340 included in the second heater assembly 300B may be disposed between the heating element 330 and the other (e.g. 122-N) of the two end portions of the cell stack 122.

The current collector 340 serves to collect electrical energy generated by the flow of electrons in the cell stack 122 and to supply the same to the load of the vehicle in which the fuel cell 100 is used. In an example, the current collector 340 may be implemented as a metal plate, which is made of an electrically conductive material, and may be conductively connected to the cell stack 122.

The heating element 330 may be disposed between at least one of the two end portions of the cell stack 122 and the end plates 110A and 110B. In an example, referring to FIG. 2, the heating element 330 of the first heater assembly 300A may be disposed between one (e.g. 122-1) of the two end portions of the cell stack 122 and the first end plate 110A, and the heating element 330 of the second heater assembly 300B may be disposed between the other (e.g. 122-N) of the two end portions of the cell stack 122 and the second end plate 110B.

In an example, the heating element 330 may include a heating part, which is composed of a carbon paste and an electrode, and a protective film part, which is configured such that a polyethylene terephthalate (PET) layer disposed on both surfaces of the heating part, an aluminum layer disposed on both surfaces of the PET layer, and a PET layer disposed on both surfaces of the aluminum layer are sequentially stacked.

Further, in the heating element 330, the pattern of the heating part, which is composed of the carbon paste and the electrode, may take any of various forms, and the heat density may be adjusted for each part by changing the pattern of the heating part. Furthermore, the heating element 330 may be implemented as a planar heating element, for example, a polymer positive temperature coefficient (PTC) heating element. If moisture permeates the carbon paste performing a PTC function for a long time, heat generation performance is eventually deteriorated. In order to prevent permeation of moisture, a PET film is attached to the carbon paste and the electrode, thereby improving resistance to moisture.

In particular, the heating element 330 may be further provided with an aluminum thin film and a PET film, which have high resistance to moisture. In this case, in order to prevent the withstand voltage performance from being deteriorated by the presence of aluminum, which is conductive, the aluminum thin film may be manufactured to have a smaller size than the PET film, thereby improving not only moisture resistance characteristics but also withstand voltage characteristics.

Further, in some implementations, thermal grease or a thermal pad may be interposed between the heating element 330 and the current collector 340 so as to ensure close contact therebetween. Due to the thermal pad or the thermal grease interposed between the heating element 330 and the current collector 340 in order to improve heat conductivity, the heat generated by the heating element 330 may be efficiently transferred to the unit cells 122-$n$ of the cell stack 122 via the current collector 340.

The pad 320 blocks the heat generated by the heating element 330 from traveling in the direction in which the cell stack 122 faces the end plates 110A and 110B, and causes a larger amount of heat to travel to the cell stack 122. In this way, the pad 320 may exhibit a thermal insulation function of preventing heat loss. In addition, the pad 320 may also serve to buffer the clamping pressure of the cell stack 122. To this end, the pad 320 may be disposed between the end plates 110A and 110B and the heating element 330. For example, the pad 320 may be implemented as a foamed silicon sheet, and may prevent damage to the film-type heating element 330 when assembled with the heater plate 310 and the heating element 330 so as to be stacked in close contact therewith. However, the implementations are not limited to any specific material of the pad 320. Alternatively, the pad 320 may be omitted from the fuel cell 100 according to the implementation.

Figure 3:
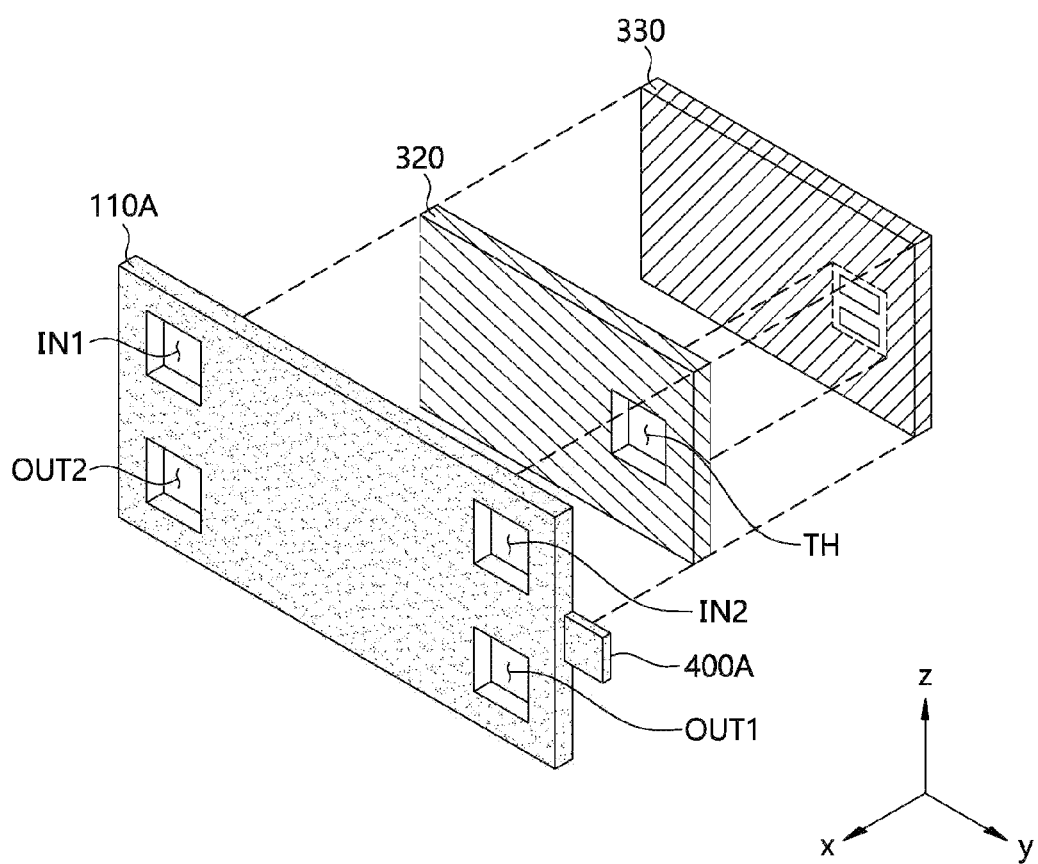
FIG. 3 is an exploded perspective view of a first heater assembly.

In addition, as shown in FIG. 3 to be described later, the pad 320 may have a through-hole TH defined therein to allow a first terminal T1 of a heater connector (or a heater wiring connector) and a second terminal T2 of the heating element 330 to be in contact with and connected to each other, which will be described later.

The heater plate 310 is conceptually a dummy cell, which is a unit cell disposed at the outermost position in the direction in which the unit cells 122-$n$ are stacked in the cell stack 122. The heater plate 310 may be formed in the shape of a plate corresponding to the external shape of the unit cells 122-$n$.

In addition, the heater plate 310 may have communication portions penetrating both side surfaces thereof in the first direction, for example, the first and second inflow communication portions IN1 and IN2 and the first and second outflow communication portions OUT1 and OUT2.

In addition, the heater plate 310 may be implemented as a single plate, as shown in the drawings.

Alternatively, unlike what is shown in the drawings, the heater plate 310 may be configured such that a plurality of unit heater plates, e.g. three unit heater plates, is stacked in the first direction. Similar to the membrane electrode assembly 210 in which the fuel electrode 214, the polymer electrolyte membrane 212, and the air electrode 216 are assembled into an integral form, the three unit heater plates constituting the heater plate 310 may be stacked in the first direction.

The heater plate 310 may be disposed on at least one of the two end portions 122-1 and 122-N of the cell stack 122. For example, as shown in FIG. 2, the first heater plate 310 of the first heater assembly 300A may be disposed between the first end plate 110A and one (e.g. 122-1) of the two end portions of the cell stack 122, and the second heater plate 310 of the second heater assembly 300B may be disposed between the second end plate 110B and the other (e.g. 122-N) of the two end portions of the cell stack 122.

In addition, the heater plate 310 may be configured such that a metallic pipe is integrally formed with a plastic body through insert injection molding, and the pipe may form flow channels (e.g. a hydrogen channel and an oxygen channel). However, the implementations are not limited to any specific material of the heater plate 310.

Hereinafter, the heater connector and the end plates according to the implementation will be described in more detail with reference to the accompanying drawings. Since the end plates 110A and 110B respectively serve as the heater plates 310A and 310B of the first and second heater assemblies 300A and 300B, the following description will be made on the assumption that the heater plates 310A and 310B are omitted. Therefore, the heater connector may be disposed on at least one of the first end plate 110A or the second end plate 110B, in place of the heater plates 310A and 310B.

Hereinafter, the fuel cell according to the implementation will be described as including both the heater connector disposed on the first end plate 110A and the heater connector disposed on the second end plate 110B. However, the following description may also apply to the case in which the heater connector is disposed on only one of the first and second end plates 110A and 110B.

Figure 4A:
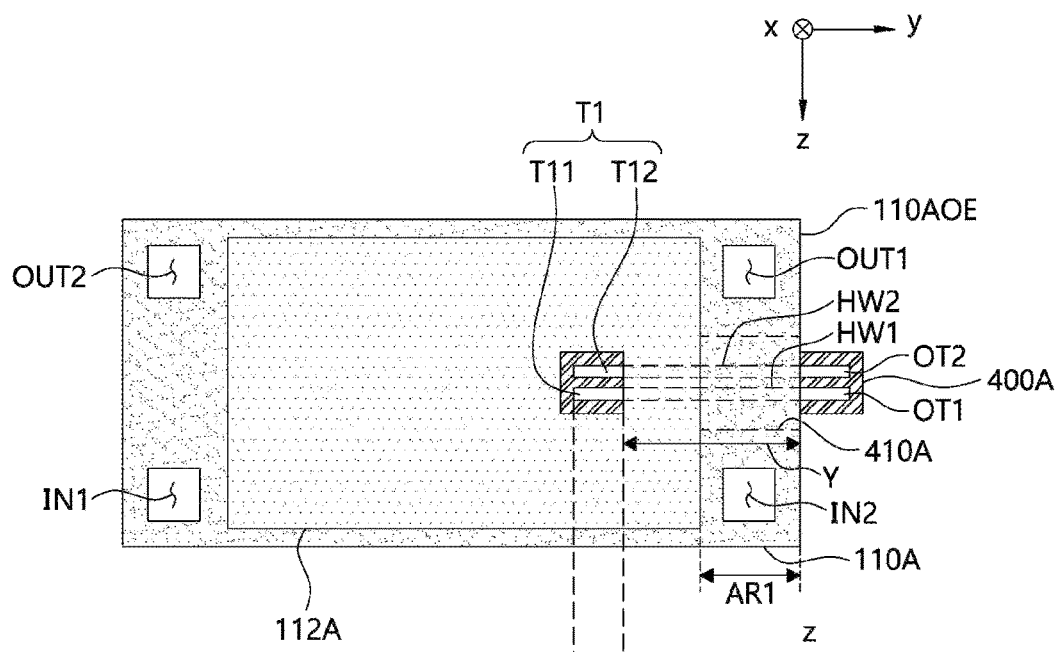
FIG. 4A illustrates the configurations of a first end plate and a first heater connector.
Figure 4B:
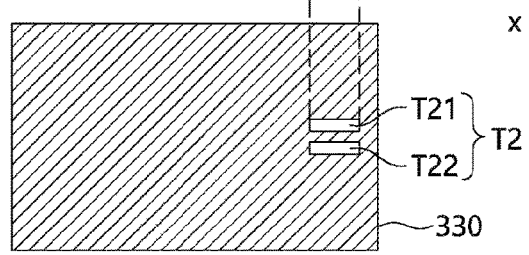
FIG. 4B illustrates the configuration of a heating element.

FIG. 3 is an exploded perspective view of the first heater assembly 300A according to an implementation, FIG. 4A illustrates the configurations of the first end plate 110A and the heater connector 400A according to an implementation, and FIG. 4B illustrates the configuration of the heating element 330 according to an implementation. Illustration of the current collector 340 is omitted from FIG. 3. For better understanding, portions that are disposed inside and are invisible from the outside are denoted by dotted lines in FIG. 4A.

Figure 5:
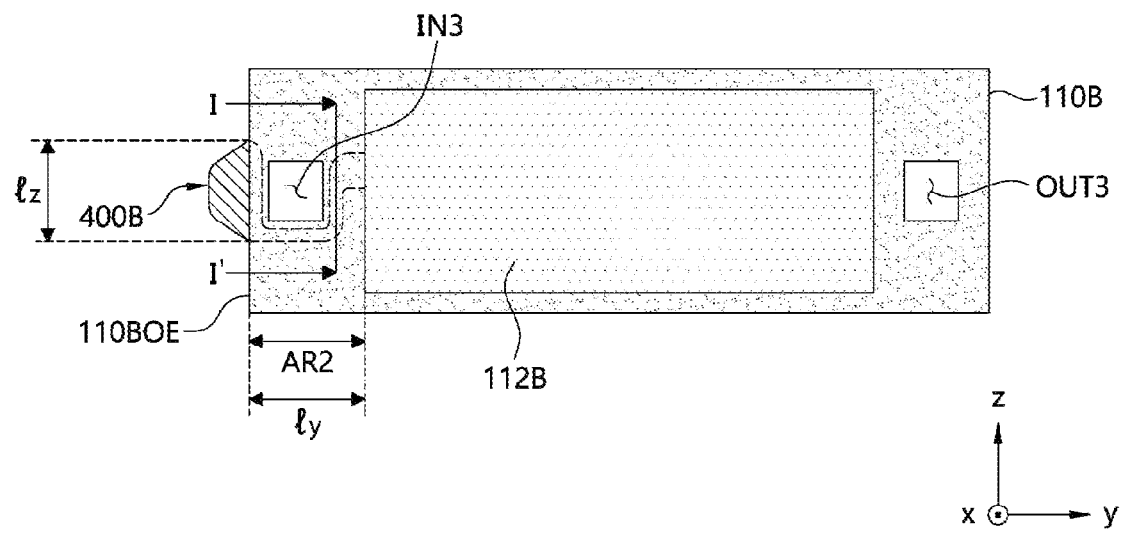
FIG. 5 is a front view of a second end plate and a second heater connector.
Figure 6A:
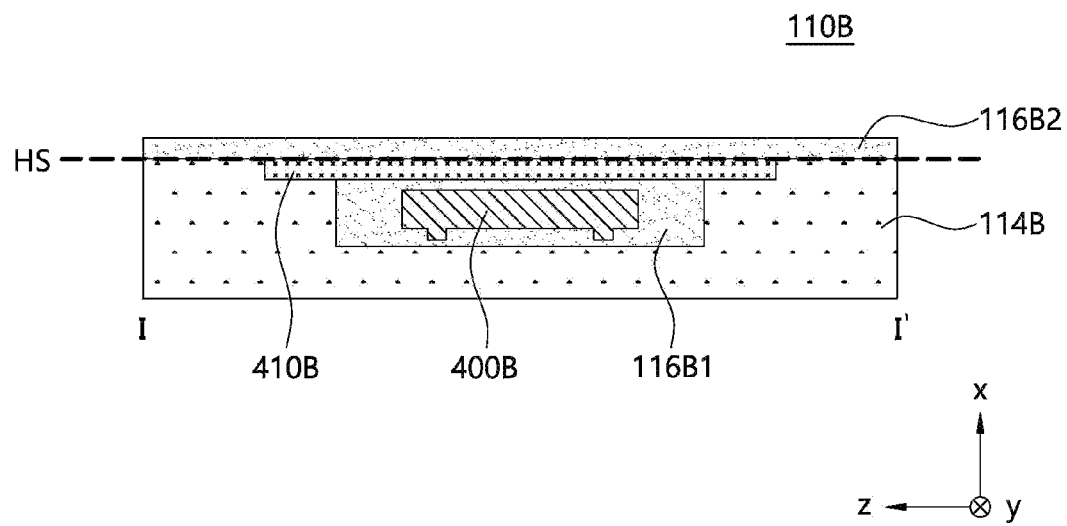
FIG. 6A is an assembled cross-sectional view taken along line I-I' shown in FIG. 5.
Figure 6B:
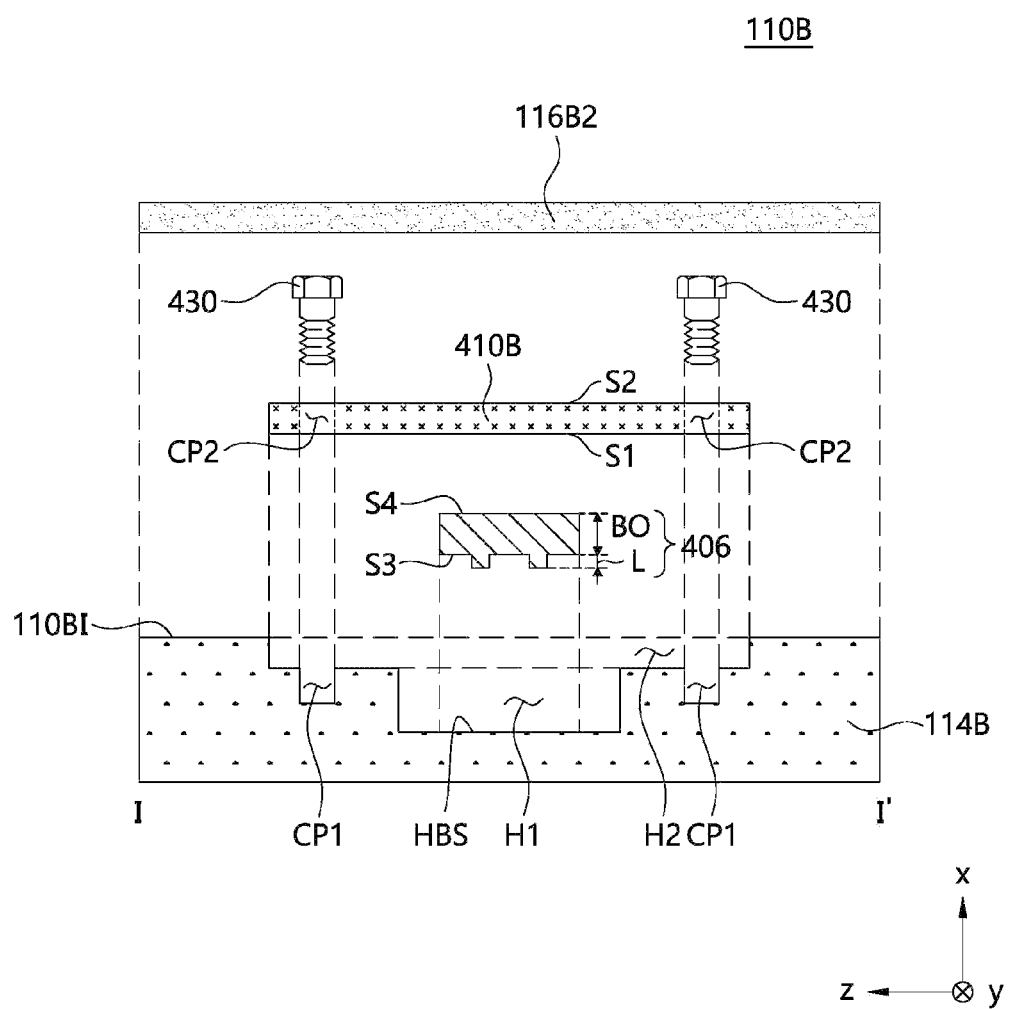
FIG. 6B is an exploded cross-sectional view taken along line I-I' shown in FIG. 5.

FIG. 5 is a front view of the second end plate 110B and the heater connector 400B according to an implementation, FIG. 6A is an assembled cross-sectional view taken along line I-I' shown in FIG. 5, and FIG. 6B is an exploded cross-sectional view taken along line I-I' shown in FIG. 5. For better understanding, the portion of the heater connector 400B that is disposed inside and is invisible from the outside is denoted by dotted lines in FIG. 5. In addition, illustration of the screws 430 and the first and second coupling portions CP1 and CP2 shown in FIG. 6B is omitted from FIG. 6A.

Each of the first and second end plates 110A and 110B may include a core (or a metal insert) and a clad (or a resin material). In an example, as shown in FIG. 6A, the second end plate 110B may include a core 114B and clads 116B1 and 116B2. In some implementations, the first end plate 110A may also include a core and clads, like the configuration shown in FIG. 6A. In addition, the first end plate 110A may further include a reinforcement plate 410A, and the second end plate 110B may further include a reinforcement plate 410B.

In this case, according to the implementation, the core may be enveloped by the clads.

The core 114B may have a first rigidity, each of the reinforcement plates 410A and 410B may have a second rigidity, and each of the clads 116B1 and 116B2 may have a third rigidity. Here, the third rigidity may be less than each of the first rigidity and the second rigidity. In an example, the first rigidity and the second rigidity may be equal to each other. That is, the material of the reinforcement plates 410A and 410B and the material of the core 114B may be the same as each other.

For example, the material of each of the core 114B and the reinforcement plates 410A and 410B may be a metal material, such as aluminum or SUS, and the material of the clads 116B1 and 116B2 may be an insulative resin material. Here, the resin material may be a synthetic resin rubber-based material or plastic, but the implementations are not limited to any specific material of the resin material. The core 114B of each of the first and second end plates 110A and 110B may be characterized by high rigidity in order to withstand the internal surface pressure, and may be embodied by machining a metal material.

In an example, each of the first and second end plates 110A and 110B may be defined by coupling a plurality of plates to each other. However, the implementations are not limited to any specific number of plates constituting each of the first and second end plates 110A and 110B.

Hereinafter, for convenience of description, the heater connector 400A disposed on the first end plate 110A will be referred to as a "first heater connector", the heater connector 400B disposed on the second end plate 110B will be referred to as a "second heater connector", and the first or second heater connector 400A or 400B will be referred to as a "heater connector".

As shown in FIG. 4A, in the first end plate 110A, the first heater connector 400A may be disposed between the oxygen inlet IN2 and the hydrogen outlet OUT1. Alternatively, unlike what is shown in FIG. 4A, the first heater connector 400A may be disposed between the hydrogen inlet IN1 and the oxygen outlet OUT2. As shown in FIG. 5, in the second end plate 110B, the second heater connector 400B may be disposed near the coolant inlet IN3. Alternatively, unlike what is shown in FIG. 5, the second heater connector 400B may be disposed near the coolant outlet OUT3.

Figure 7:
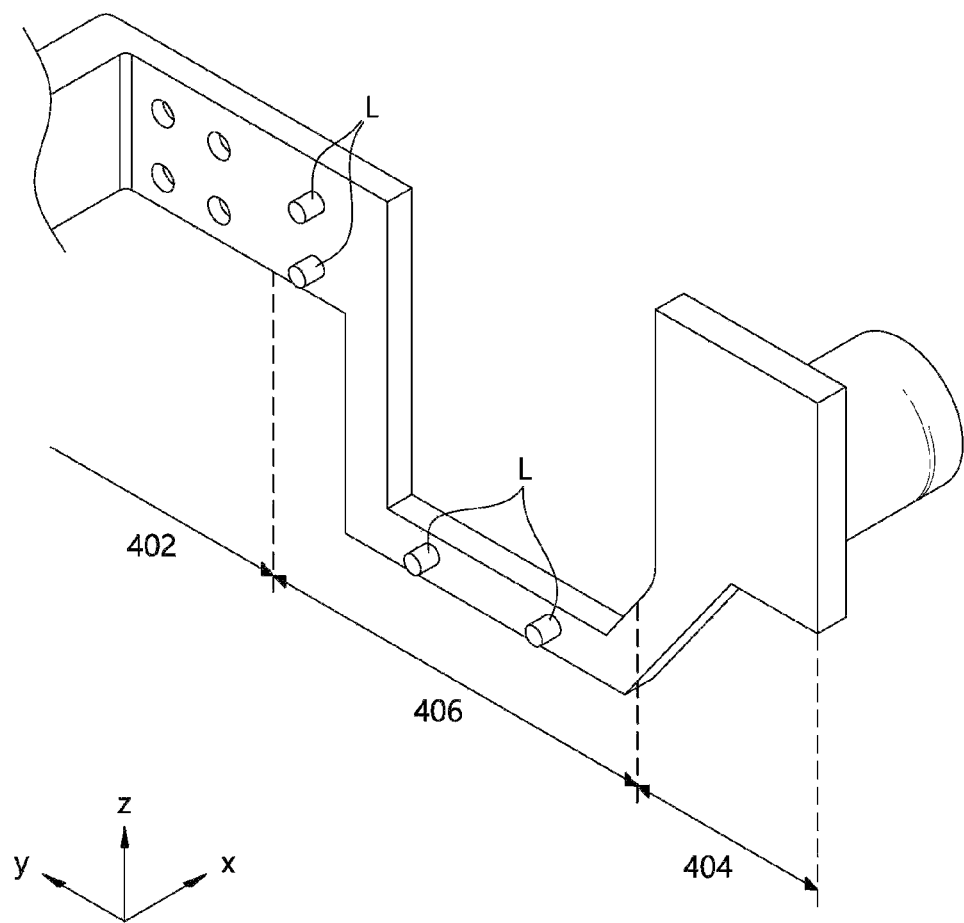
FIG. 7 is a perspective view showing an implementation of the second heater connector.

FIG. 7 is a perspective view showing an implementation of the second heater connector 400B.

Each of the first and second heater connectors 400A and 400B may include a first terminal, an extension portion, and a connection portion. In an example, as shown in FIG. 4A, the first heater connector 400A may include a first terminal T1, extension portions OT1 and OT2, and a connection portion Y, and as shown in FIG. 7, the second heater connector 400B may include a first terminal 402, an extension portion 404, and a connection portion 406.

As shown in FIG. 4A, the connection portion Y of the first heater connector 400A is disposed between the oxygen inlet IN2 and the hydrogen outlet OUT1, and thus has a straight shape, rather than being curved. On the other hand, the connection portion 406 of the second heater connector 400B is disposed near the coolant inlet IN3, and thus has a curved shape that bypasses the coolant inlet IN3.

Except for the difference in position and shape between the first heater connector 400A and the second heater connector 400B, the first heater connector 400A is the same as the second heater connector 400B, and the first end plate 110A is the same as the second end plate 110B. Therefore, with regard to any aspect of any one of the first and second end plates 110A and 110B that is not described in detail, reference may be made to the description of the other of the first and second end plates 110A and 110B, and with regard to any aspect of any one of the first and second heater connectors 400A and 400B that is not described in detail, reference may be made to the description of the other of the first and second heater connectors 400A and 400B.

Referring to FIGS. 6A and 6B, the core 114B of the second end plate 110B may have a first recess H1 defined therein. The first recess H1 serves to receive at least part of the second heater connector 400B, i.e. the connection portion 406. In addition, at least a portion of the first terminal 402 of the second heater connector 400B may be received in the first recess H1.

The reinforcement plate 410B may be disposed so as to cover the first recess H1.

In addition, as shown in FIGS. 4A and 4B, the reinforcement plate 410A may be disposed in a first region AR1 between a distal end 110AOE of the first end plate 110A and a reaction surface 112A thereof in the second direction. As shown in FIG. 5, the reinforcement plate 410B may be disposed in a second region AR2 between a distal end 110BOE of the second end plate 110B and a reaction surface 112B thereof in the second direction. That is, the length ly of the reinforcement plate 410B in the second direction may correspond to the spacing distance between the distal end 110BOE of the second end plate 110B and the reaction surface 112B thereof in the second direction.

The regions AR1 and AR2 in which the reinforcement plates 410A and 410B are disposed are regions in which gaskets are disposed. These regions have more influence on the flatness of the fuel cell than other portions.

In addition, each of the reinforcement plates 410A and 410B may have a length in the third direction so as to completely encompass an airtight line. For example, the length lz of the reinforcement plate 410B in the third direction may be a length encompassing not only the airtight line but also a space in which the second coupling portion CP2 to be described later is defined.

In addition, the reinforcement plate 410B may include a first surface S1, which faces the second end plate 110B in the first direction, and a second surface S2, which is located opposite the first surface S1 and faces the cell stack 122 in the first direction.

According to the implementation, the second surface S2 of the reinforcement plate 410B and the inner surface 110BI of the second end plate 110B, which face the cell stack 122 in the first direction, may form the same horizontal surface HS. As such, in the case in which the inner surface 110BI and the second surface S2 form the same horizontal surface HS, the flatness of the surface adjacent to the cell stack 122 is ensured, whereby surface pressure may be uniformly distributed on the reaction surfaces 112A and 112B of the cell stack 122.

The clad may include a first portion 116B1 and a second portion 116B2.

The first portion 116B1 may be disposed so as to be received in the first recess H1 and to envelop the second heater connector 400B. That is, referring to FIG. 6A, the first portion 116B1 may be disposed between the second heater connector 400B and the core 114B and between the second heater connector 400B and the reinforcement plate 410B. Since the first portion 116B1 is disposed so as to envelop the connection portion 406 of the heater connector 400B, which is disposed in the first recess H1, the connection portion 406 and the core 114B may be electrically isolated from each other, and the connection portion 406 and the reinforcement plate 410B may be electrically isolated from each other.

The second portion 116B2 may be disposed so as to cover the second surface S2 of the reinforcement plate 410B and at least a portion of the inner surface 110BI of the second end plate 110B (i.e. the upper surface of the core 114B). Illustration of the second portion 116B2 is omitted from FIG. 6B.

In addition, the second end plate 110B may further have therein a second recess H2 defined around the first recess H1. The second recess H2 serves to receive the reinforcement plate 410B.

In addition, the second end plate 110B may include a first coupling portion CP1 in the second recess H2, and the reinforcement plate 410B may include a second coupling portion CP2 coupled to the first coupling portion CP1.

According to one implementation, the first coupling portion CP1 and the second coupling portion CP2 may be coupled to each other in a force-fitting manner. For example, one of the first coupling portion CP1 and the second coupling portion CP2 may be formed in the shape of a coupling protrusion, and the other of the first coupling portion CP1 and the second coupling portion CP2 may be formed in the shape of a coupling recess into which the coupling protrusion is inserted.

According to another implementation, the first coupling portion CP1 and the second coupling portion CP2 may be screwed to each other. To this end, referring to FIG. 6B, the fuel cell may further include a screw 430, the first coupling portion CP1 may be formed to have the cross-sectional shape of a blind hole in which the screw 430 is received and secured, and the second coupling portion CP2 may be formed to have the cross-sectional shape of a through-hole through which the screw 430 passes.

However, the implementations are not limited to any specific manner of coupling between the first coupling portion CP1 and the second coupling portion CP2 or to any specific shape thereof.

The first heater connector 400A may be embedded in the first end plate 110A so as to be electrically connected to the heating element 330, and the second heater connector 400B may be embedded in the second end plate 110B so as to be electrically connected to the heating element 330. That is, the first and second heater connectors 400A and 400B may receive a drive signal (voltage or current) necessary to drive the heating element 330 from outside the first and second end plates 110A and 110B (e.g. the cell stack 122), and may transfer the received drive signal to the heating element 330. To this end, as shown in FIG. 4A, the first terminal T1 of the first heater connector 400A may be connected to the heating element 330. In some implementations, the first terminal 402 of the second heater connector 400B may also be connected to the heating element 330 in the same manner as shown in FIGS. 4A and 4B. In addition, each of the extension portions OT1 and OT2 of the first heater connector 400A and the extension portion 404 of the second heater connector 400B may be connected to a drive signal. The connection portion Y of the first heater connector 400A may electrically connect the first terminal T1 and the extension portions OT1 and OT2 to each other, and the connection portion 406 of the second heater connector 400B may electrically connect the first terminal 402 and the extension portion 404 to each other.

According to the implementation, the first terminals T1 and 402 and the extension portions OT1 and OT2 may be electrically connected to each other via wires. In an example, referring to FIG. 4A, the connection portion Y of the first heater connector 400A may include two wires HW1 and HW2 for electrically connecting the first terminals T1 (T11 and T12) to the extension portions OT1 and OT2.

The first wire HW1 may serve to connect the first terminal T1 (T11) to the extension portion OT1, and the second wire HW2 may serve to connect the first terminal T1 (T12) to the extension portion OT2. That is, one of the two ends of the first wire HW1 may be connected to the first terminal T11, and the other of the two ends of the first wire HW1 may be connected to the extension portion OT1. One of the two ends of the second wire HW2 may be connected to the first terminal T12, and the other of the two ends of the second wire HW2 may be connected to the extension portion OT2.

In an example, the first terminal T1 may include a pair of male heater terminals T11 and T12, and the second terminal T2 may include a pair of female heater terminals T21 and T22. In another example, the first terminal T1 may include a pair of female heater terminals T11 and T12, and the second terminal T2 may include a pair of male heater terminals T21 and T22. The first terminals T11 and T12 and the second terminals T21 and T22 may be electrically connected to each other in a female-male coupling manner. However, the implementations are not limited to any specific manner of coupling between the first terminal T1 and the second terminal T2.

The connection portions 406 of the second heater connector 400B may include a third surface S3 and a fourth surface S4. In an example, as shown in FIG. 6B, the third surface S3 is a surface that faces the second end plate 110B in the first direction, and the fourth surface S4 is a surface that is located opposite the third surface S3 and faces the cell stack 122 in the first direction.

The connection portion 406 may include a body BO and a support leg L. The body BO is a portion in which the wires HW1 and HW2 connecting the first terminal 402 to the extension portion 404 are embedded, and the support leg L is a portion that protrudes from the body BO toward the bottom surface HBS of the first recess H1 in the first direction. Although the case in which four support legs L are provided is illustrated in FIG. 7, the implementations are not limited to any specific number of support legs L.

By virtue of the support leg L, the third surface S3 of the connection portion 406 and the bottom surface HBS of the first recess H1 may be spaced apart from each other, with the first portion 116B1 interposed therebetween. This will be described later in detail when a manufacturing method is described.

Hereinafter, a method of manufacturing the fuel cell according to the implementation, in which the heater connector is assembled to the end plate, will be described with reference to the accompanying drawings.

FIGS. 8A to 8D are perspective views for explaining processes of a method of manufacturing the fuel cell according to the implementation.

Figure 8A:
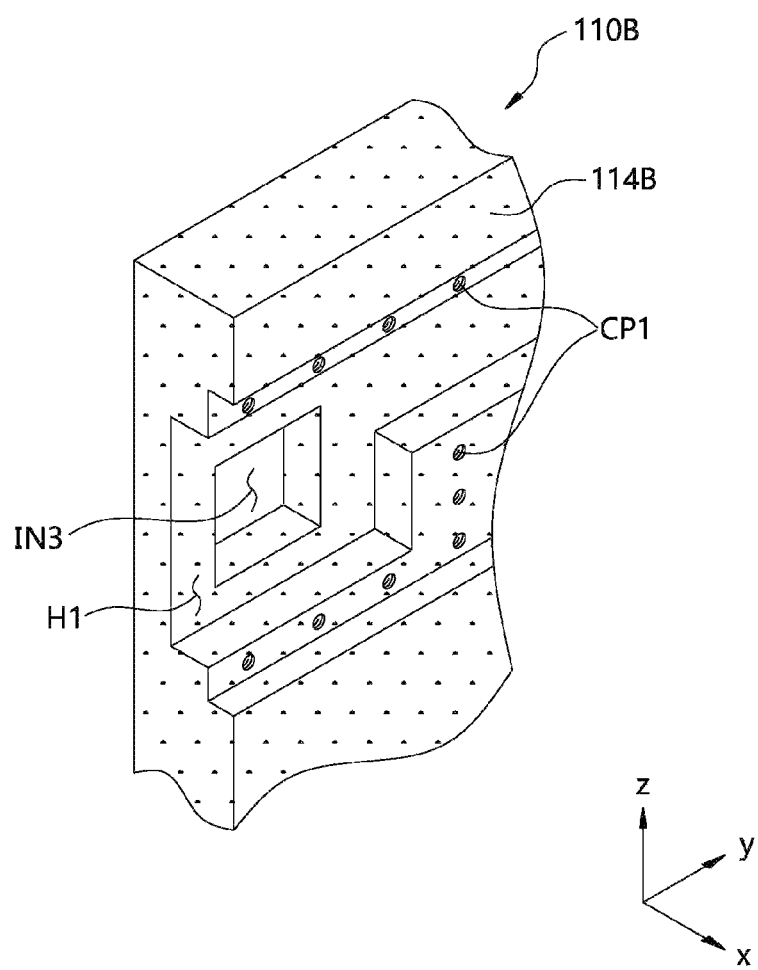
FIGS. 8A to 8D are perspective views for explaining processes of a method of manufacturing the fuel cell.

The core 114B of the second end plate 110B, which has the configuration shown in FIG. 8A, is prepared.

Figure 8B:
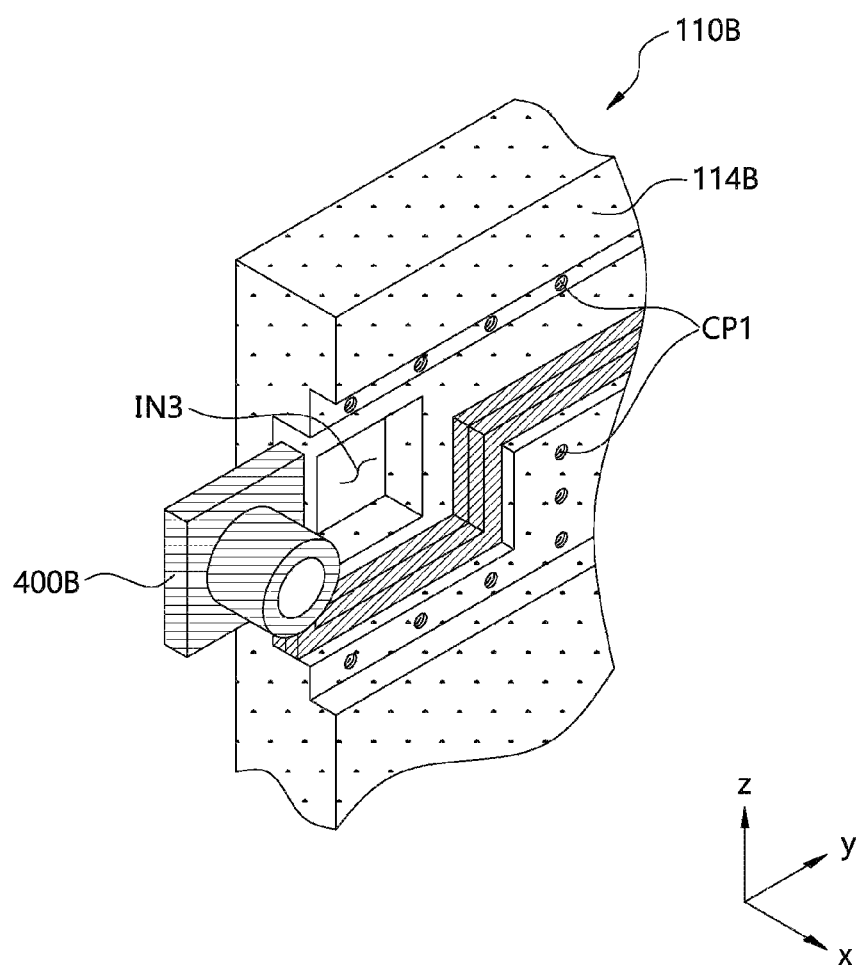

Thereafter, as shown in FIG. 8B, the connection portion 406 of the second heater connector 400B is seated in the first recess H1 in the core 114B.

Figure 8C:
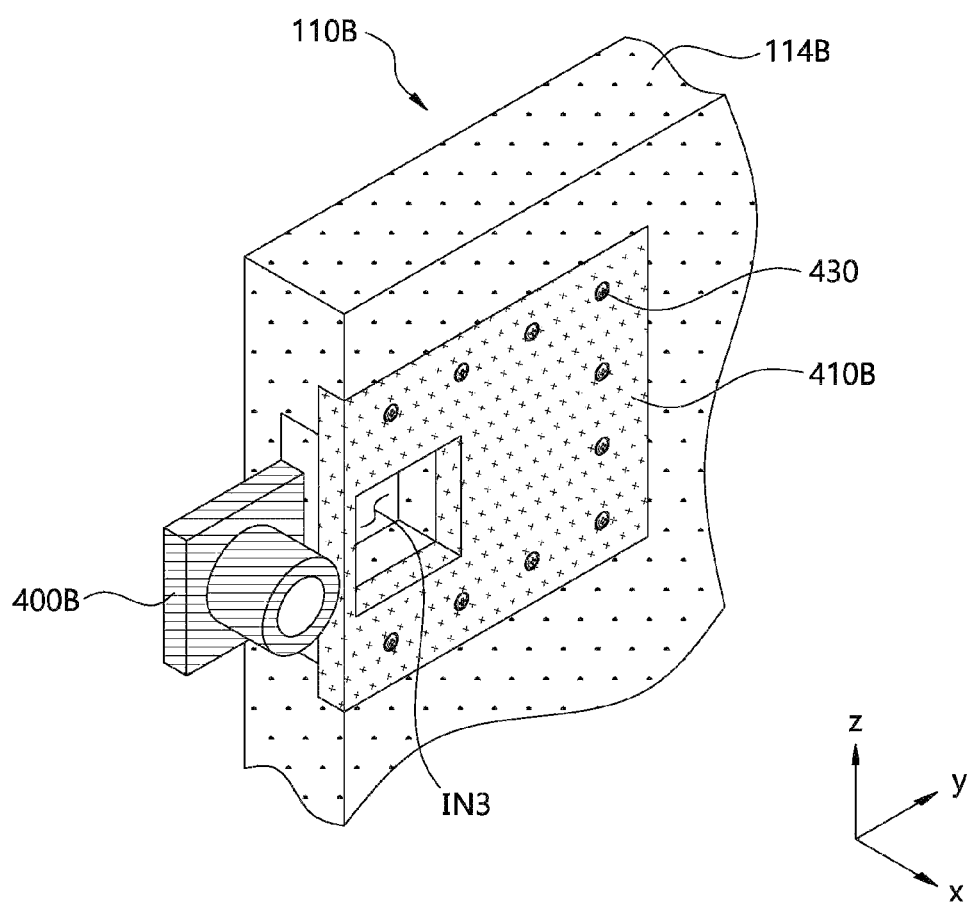

Thereafter, as shown in FIG. 8C, the reinforcement plate 410B is disposed in the second recess H2, and is then coupled to the core 114B using the screw 430.

Figure 8D:
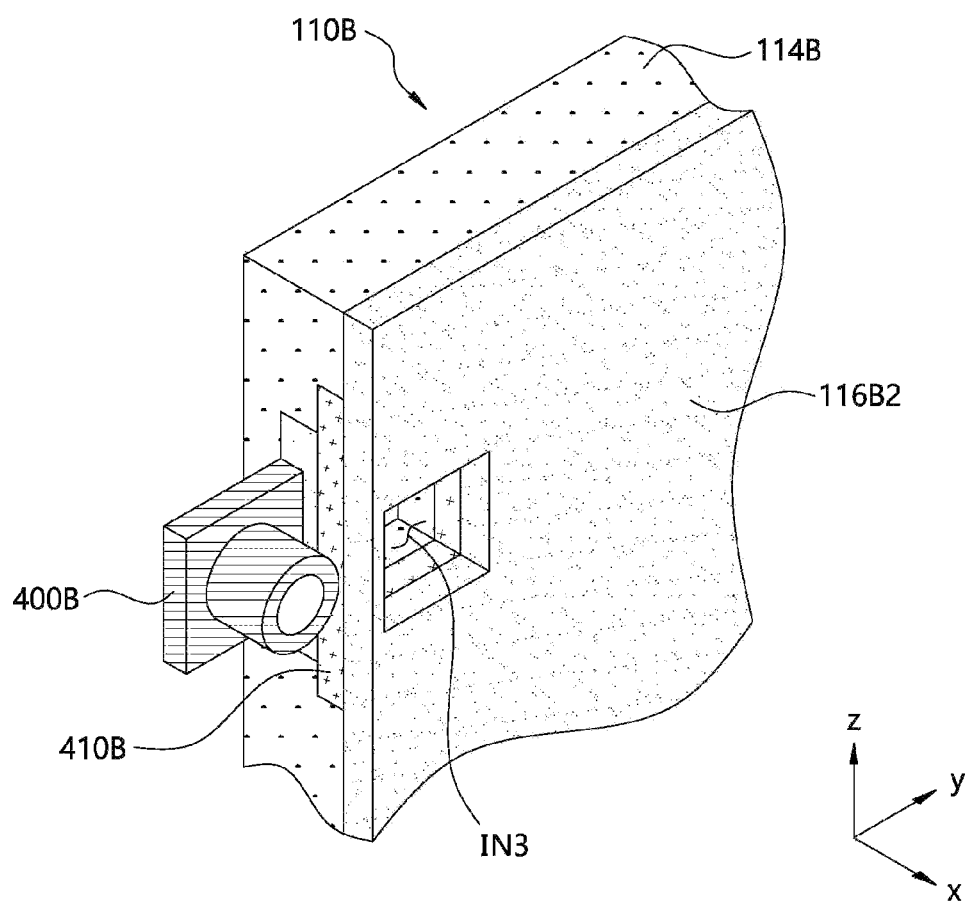

Thereafter, as shown in FIG. 8D, the first portion 116B1 of the clad is embedded in the first recess H1 through an injection molding process, and the second portion 116B2 is applied to the reinforcement plate 410B and the core 114B. In this case, if the connection portion 406 is not provided with the support leg L, the third surface S3 of the connection portion 406 may come into contact with the bottom surface HBS of the first recess H1, and thus the first portion 116B1 may not be formed between the third surface S3 and the bottom surface HBS. However, according to the implementation, since the connection portion 406 includes the support leg L, when the connection portion 406 is seated in the first recess H1 and subsequently the first portion 116B1 is embedded in the first recess H1, a resin material is charged into the first recess H1 in the state in which the third surface S3 of the connection portion 406 is spaced apart from the bottom surface HBS of the first recess H1 by the support leg L. Accordingly, the first portion 116B1 may be disposed between the third surface S3 of the connection portion 406 and the bottom surface HBS of the first recess H1. As a result, it is possible to ensure electrical isolation of the connection portion 406 from the core 114B due to the support leg L.

Hereinafter, a fuel cell according to a comparative example and the fuel cell according to the implementation will be described with reference to the accompanying drawings.

Figure 9:
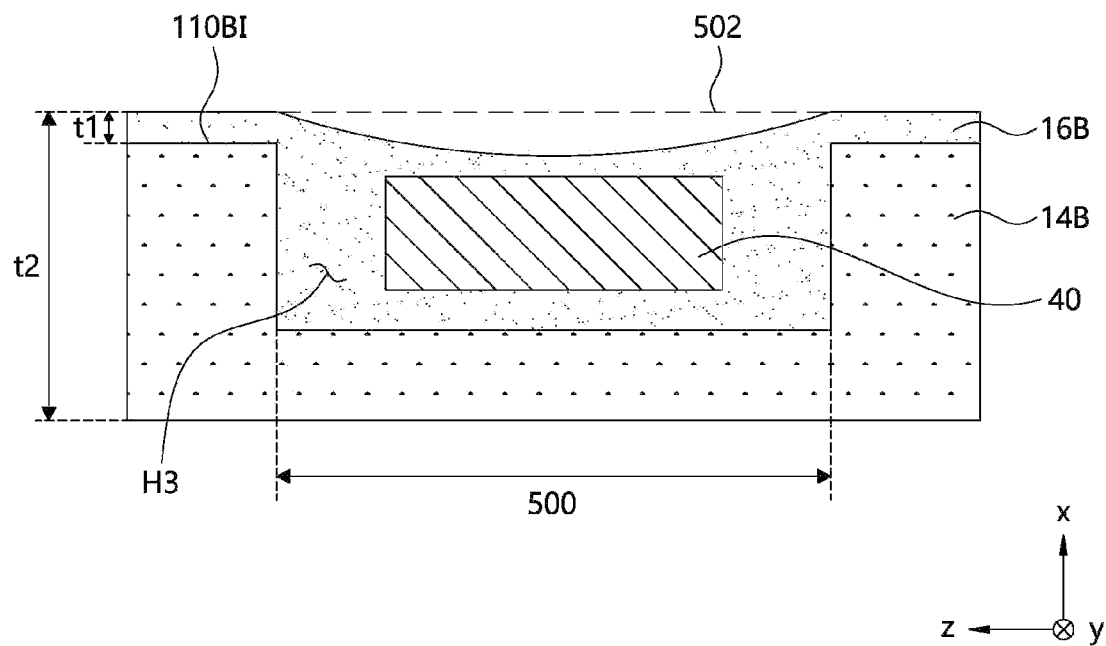
FIG. 9 is a cross-sectional view of a fuel cell.

FIG. 9 is a cross-sectional view of a fuel cell according to a comparative example.

The fuel cell according to the comparative example shown in FIG. 9 includes a core 14B, a heater connector 40, and a clad 16B. The core 14B, the heater connector 40, and the clad 16B respectively perform the same functions as the core 114B, the second heater connector 400B, and the clad shown in FIGS. 6A and 6B, and thus duplicate descriptions thereof will be omitted. That is, unlike the fuel cell according to the implementation, the fuel cell according to the comparative example does not include the reinforcement plate 410B. Further, unlike the implementation, the clad 16B according to the comparative example is not divided into the first and second portions 116B1 and 116B2, and is embedded in a third recess H3 while enveloping the heater connector 40.

In the case of the fuel cell according to the comparative example, a portion of the clad 16B that is disposed on the inner surface 110BI of the core 14B of the second end plate 110B has a first thickness t1, and a portion of the clad 16B that is embedded in the third recess H3 while enveloping the heater connector 40 disposed in the third recess H3 has a second thickness t2. For example, the second thickness t2 may be at least four times greater than the first thickness t1. Since the second thickness t2 is greater than the first thickness t1, as shown in FIG. 9, the portion of the clad 16B that has the second thickness t2 and overlaps the third recess H3 in the first direction may contract, and thus the upper part thereof may have a shape that is concavely depressed in the first direction. This phenomenon is more prominent when the second thickness t2 is greater. Furthermore, this phenomenon is more prominent in the clad 16B covering the second heater connector 40 located between the cell stack 122 and the second end plate 110B than in the clad covering the first heater connector located between the cell stack 122 and the first end plate 110A. In the case in which the clad 16B is concavely depressed as shown in FIG. 9, the surface pressure of the fuel cell may be less uniform than in the case in which the clad 16B is flat (refer to reference numeral 502).

In contrast, according to the implementation, by virtue of the reinforcement plate 410B disposed between the second portion 116B2 and the first portion 116B1 of the clad, the clad maintains a constant thickness without being concavely depressed, unlike what is shown in FIG. 9. Accordingly, the flatness of the clad 116B2 may be improved, and thus the flatness of the surface adjacent to the cell stack 122 may also be improved, thereby ensuring uniform distribution of surface pressure.

As described above, airtightness/watertightness may be maintained by the gaskets 232, 234, and 236 shown in FIG. 2, and thus the flatness of the surface adjacent to the cell stack 122 that generates electric power may be ensured, whereby surface pressure may be uniformly distributed on the reaction surfaces 112A and 112B of the cell stack 122. Considering this, in the fuel cell according to the implementation, the reinforcement plates 410A and 410B are disposed in the regions AR1 and AR2 in which the gaskets are disposed. Accordingly, the flatness of the surface adjacent to the cell stack 122 may be improved, and thus uniform distribution of surface pressure may be achieved.

Considering that the depression phenomenon shown in FIG. 9 is more prominent in the clad 16B covering the second heater connector 40 located between the cell stack 122 and the second end plate 110B than in the clad covering the first heater connector located between the cell stack 122 and the first end plate 110A, in the fuel cell according to the implementation, the second end plate 110B, in which the second heater connector 400B is embedded, includes the reinforcement plate 410B, as shown in FIGS. 6A and 6B, whereas the first end plate 110A, in which the first heater connector 400B is embedded, may include the reinforcement plate 410A, or may not include the reinforcement plate 410A.

The fuel cell according to the implementation has been described above as including only one cell stack. However, according to another implementation, the fuel cell may also be applied to the case in which a plurality of cell stacks configured as described above is stacked in the third direction.

As is apparent from the above description, the fuel cell according to the implementation is provided with a reinforcement plate, which enables a clad to maintain a constant thickness without being concavely depressed. Accordingly, the flatness of the clad may be improved, and thus uniform distribution of surface pressure may be achieved.

However, the effects achievable through the disclosure are not limited to the above-mentioned effects, and other effects not mentioned herein will be clearly understood by those skilled in the art from the above description.

The above-described various implementations may be combined with each other without departing from the scope of the present disclosure unless they are incompatible with each other.

In addition, for any element or process that is not described in detail in any of the various implementations, reference may be made to the description of an element or a process having the same reference numeral in another implementation, unless otherwise specified.

While the present disclosure has been particularly shown and described with reference to exemplary implementations thereof, these implementations are only proposed for illustrative purposes, and do not restrict the present disclosure, and it will be apparent to those skilled in the art that various changes in form and detail may be made without departing from the essential characteristics of the implementations set forth herein. For example, respective configurations set forth in the implementations may be modified and applied. Further, differences in such modifications and applications should be construed as falling within the scope of the present disclosure as defined by the appended claims.

What is claimed is:

1. A fuel cell, comprising:
   a cell stack comprising a plurality of unit cells stacked in a first direction;
   an end plate disposed at at least one of two ends of the cell stack;
   a heating element disposed between the end plate and the cell stack; and
   a heater connector disposed at the end plate and electrically connected to the heating element, wherein the end plate comprises:
 a core having a first rigidity and having a first recess defined therein to receive at least a portion of the heater connector;
 a reinforcement plate covering the first recess and having a second rigidity; and
 a clad having a third rigidity less than each of the first rigidity and the second rigidity and disposed to envelop the heater connector and to cover the core and the reinforcement plate.

2. The fuel cell according to claim 1, wherein the reinforcement plate and the core are made of a same material.

3. The fuel cell according to claim 1, wherein the end plate further comprises a second recess defined around the first recess to receive the reinforcement plate.

4. The fuel cell according to claim 3, wherein the reinforcement plate is disposed between a distal end of the end plate and a reaction surface in a second direction intersecting the first direction.

5. The fuel cell according to claim 3, wherein the reinforcement plate comprises:
 a first surface facing the end plate; and
 a second surface disposed opposite the first surface and facing the cell stack,
 wherein an inner surface of the end plate facing the cell stack and the second surface of the reinforcement plate form a same horizontal surface.

6. The fuel cell according to claim 5, wherein the clad comprises:
 a first portion embedded in the first recess and disposed between the heater connector and the core and between the heater connector and the reinforcement plate; and
 a second portion covering the second surface of the reinforcement plate and at least a portion of the inner surface of the end plate.

7. The fuel cell according to claim 5, wherein the end plate further comprises a first coupling portion defined in the second recess, and
 wherein the reinforcement plate comprises a second coupling portion coupled to the first coupling portion.

8. The fuel cell according to claim 7, further comprising:
 a screw coupling the first coupling portion and the second coupling portion to each other.

9. The fuel cell according to claim 5, wherein the heater connector comprises:
 a first terminal coupled to the heating element;
 an extension portion configured to be connected to a drive signal, the driving signal driving the heating element; and
 a connection portion interconnecting the first terminal and the extension portion and embedded in the second recess.

10. The fuel cell according to claim 9, wherein the connection portion of the heater connector comprises:
 a third surface facing the end plate in the first direction; and
 a fourth surface disposed opposite the third surface and facing the cell stack in the first direction.

11. The fuel cell according to claim 10, wherein the connection portion comprises:
 a body in which a wire is embedded, the wire interconnecting the first terminal and the extension portion; and
 a support leg protruding from the body toward a bottom surface of the first recess in the first direction.

12. The fuel cell according to claim 1, wherein the end plate comprises:
 a first end plate disposed at one end of the cell stack; and
 a second end plate disposed at the other end of the cell stack,
 wherein the first end plate comprises:
  an oxygen inlet configured to receive air introduced thereinto from an outside;
  a hydrogen inlet configured to receive hydrogen introduced thereinto from the outside;
  a hydrogen outlet configured to discharge hydrogen therethrough from the cell stack to the outside; and
  an oxygen outlet configured to discharge oxygen therethrough from the cell stack to the outside, and
 wherein the second end plate comprises:
  a coolant inlet configured to receive a cooling medium introduced thereinto from the outside; and
  a coolant outlet configured to discharge the cooling medium therethrough to the outside.

13. The fuel cell according to claim 12, wherein the heater connector is disposed between the hydrogen inlet and the oxygen outlet at the first end plate or between the oxygen inlet and the hydrogen outlet at the first end plate.

14. The fuel cell according to claim 12, wherein the heater connector is disposed at a periphery of the coolant inlet or the coolant outlet at the second end plate.

15. The fuel cell according to claim 13, wherein the heater connector has a straight shape, based on the heater connector being disposed between the oxygen inlet and the hydrogen outlet.

16. The fuel cell according to claim 14, wherein the heater connector has a curved shape, based on the heater connector being disposed at the periphery of the coolant inlet.

* * * * *